United States Patent [19]

Guilhem

[11] Patent Number: 4,498,304
[45] Date of Patent: Feb. 12, 1985

[54] STORAGE TANK FOR CRYOGENIC LIQUEFIED GAS

[75] Inventor: Jean R. Guilhem, Sainte-Adresse, France

[73] Assignees: Gaz de France; Applied Thermodynamics & LNG Service, both of France

[21] Appl. No.: 517,515

[22] Filed: Jul. 26, 1983

[30] Foreign Application Priority Data

Aug. 3, 1982 [FR] France .................. 82 13559

[51] Int. Cl.³ ............................... F17C 13/02
[52] U.S. Cl. .......................... 62/49; 220/421
[58] Field of Search ............ 62/49, 45; 220/421

[56] References Cited

U.S. PATENT DOCUMENTS

| 3,110,156 | 11/1963 | Niemann | 62/45 |
|---|---|---|---|
| 3,279,198 | 10/1966 | Ayers et al. | 62/45 |
| 3,395,548 | 8/1968 | Yearwood | 62/45 |
| 3,425,233 | 2/1969 | Brose | 62/45 |
| 3,627,164 | 12/1971 | Wilson | 62/45 |
| 3,695,050 | 10/1972 | Bancroft | 62/45 |
| 3,913,341 | 10/1975 | Katsuta | 62/45 |
| 3,952,531 | 4/1976 | Turner | 62/45 |
| 4,388,810 | 6/1983 | Guilhem | 62/45 |

FOREIGN PATENT DOCUMENTS

| 2294439 | 7/1976 | France . |
| 2502289 | 9/1982 | France . |
| 2515347 | 4/1983 | France . |
| 1552821 | 9/1979 | United Kingdom . |

Primary Examiner—Ronald C. Capossela
Attorney, Agent, or Firm—Poms, Smith, Lande & Rose

[57] ABSTRACT

The invention is related to a tank designed to contain a cryogenic liquefied gas and formed in addition to the main tank by two other tight walls.

In the upper part of this tank an aperture duct connects the ceiling of the tank to the exterior of the tank, a holder supporting a device sensing in various areas wall temperatures of the tank, can be fitted into this aperture duct, a remote temperature sensor is actually hold by this support and is introduced into the tank.

The invention finds an application as a means to easily localize leaking failures of the intermediate wall.

7 Claims, 2 Drawing Figures

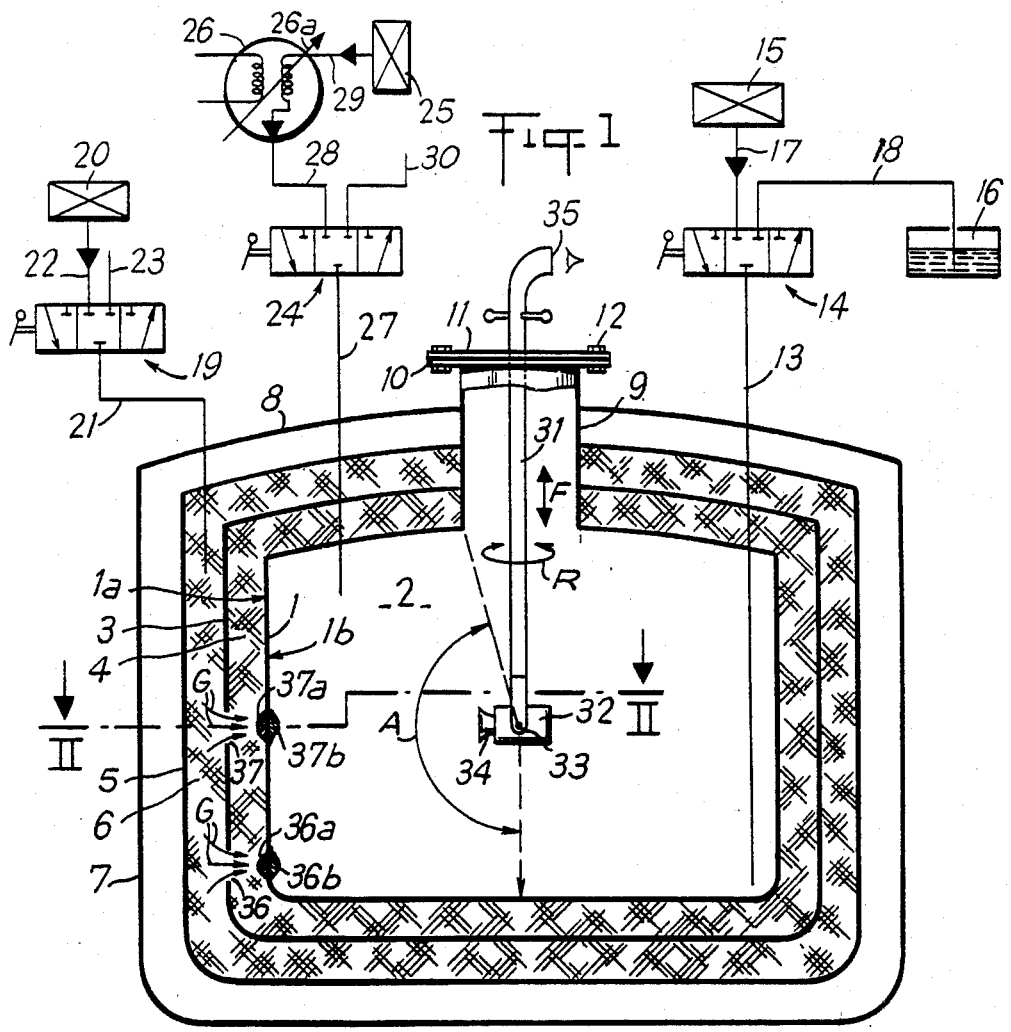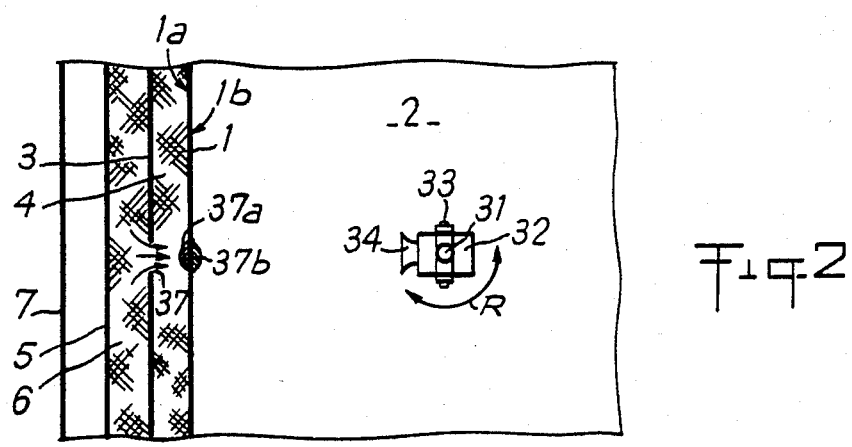

STORAGE TANK FOR CRYOGENIC LIQUEFIED GAS

The relatively recent growth of ships carrying liquefied methane or, more generally, liquefied natural gas at cryogenic temperature, has revealed that several technical problems exist which are not yet solved.

The gas is liquefied at very low temperature (in the range of minus 160° Celsius), within tanks formed by three walls in a row—these walls being theoretically tight—it is, at least, the goal of the builders—some thermally insulating materials being provided between two adjacent walls. Obviously the thermal stresses are high and although elaborate processes are used for the fabrication of the walls, some failures inducing leaks through these walls occur in service. If it is relatively easy to localize failures of the extreme walls it is, at the opposite, very difficult to localize failures of the intermediate wall.

The goal of this invention is to propose a new arrangement allowing to localize the failures of the intermediate wall without the necessity—as far as this localization is concerned—to destroy any of the extreme walls. Furthermore, if the origin of this invention results from the problems raised in order to keep the methane carriers in service, this invention is obviously more general and is applicable to any tank for cryogenic liquefied gas either installed on a ship or not.

The invention is therefore related first to a tank able to contain a cryogenic liquefied gas such as liquefied natural gas composed by:

a first wall, so-called primary barrier, limiting the main tank able to contain the liquefied gas, a second wall, so-called secondary barrier, surrounding the primary barrier being spaced out of it, a space so-called primary space, existing between these two barriers primary and secondary, a third wall, so-called external wall, surrounding the secondary barrier being spaced out of it, a space—so-called secondary space existing between secondary barrier and external wall, a filling of thermally insulating material which is contained within primary space.

preferably, another filling of thermally insulating material which is contained within secondary space, a pipe feeding inert gas into the tank—so-called gas-freeing pipe able—after the liquid gas has been unloaded from the tank—to vent what is remaining of the product under gaseous form, and, a pipe feeding safety gas into secondary space, this safety gas having—under the pressure prevailing within the primary space, a sublimation temperature, on one hand, lower than the temperature prevailing in service within secondary space, on the other hand, higher than the primary barrier temperature before a possible warming-up.

In this tank:

(a) an aperture duct connects the ceiling of the vessel to the exterior of the tank and is provided with a hole to enter the tank, (b) a holder supporting a device sensing in various areas the wall temperatures of primary barrier can be fitted into this aperture duct, (c) a remote temperature sensor is actually hold by this support and is able to be introduced into the tank through the said aperture duct.

The advantageous arrangements are also preferably provided as said below:

the remote temperature sensor is a thermograph;

the remote temperature sensor is of optical type such as a camera and is able to localize the areas of the inner face of the primary barrier on which some aggregates of frost of the said gas-freeing inert gas may persist during a warming-up operation of the tank.

The matter of this invention is also a process to localize possible failures of the secondary barrier of a tank built according to one of the above-mentioned definitions, according to which, starting from a tank containing cryogenic liquefied gas, safety fluid is fed into secondary space, the liquid gas contained in the tank is unloaded, the areas of possible aggregates of frost of the said safety gas having crossed the leaking failures of the secondary barrier and having grown on the areas of the face of primary barrier limiting the primary space and facing the said failures are localized using the temperature difference between the areas of the primary barrier covered by frost and those without frost.

Preferably, between the tank unloading and the localization of frost aggregates, the tank is gas-freed and is progressively warmed-up, warm inert gas being injected into this tank.

a quasi uniform layer of frost of this inert gas appears on the inner face of the primary barrier, the warming-up of the tank is going on until the said quasi-uniform frost layer is almost disappeared, and, by visual inspection, the islets of the inner face of the primary barrier where some frost aggregates are still remaining are localized; these islets are corresponding to the areas of the face of the primary barrier opposite to the said inner face where some aggregates of frost of safety gas exist also.

The invention will be more readily understood and some secondary advantages will appear during the description of a building hereinafter given as an example.

It has to be clear that the description and the drawings are only indicative and in no way limitative.

Reference will be made to the accompanying drawings, in which:

FIG. 1 is a cross-sectional view of a methane carrier built according to the invention;

FIG. 2 is a cross-view along II—II of FIG. 1.

The tank shown on FIG. 1 is formed by:

a first tight wall 1, so-called primary barrier limiting the main tank 2 this tank being able to contain cryogenic liquefied gas, a second tight wall 3, so-called secondary barrier, limiting together with primary barrier 1 a space 4, so-called primary space, this space 4 is filled with thermally insulating porous material, a third tight wall 5, which is the inner hull of the ship and which limits together with secondary barrier 3 a space 6, so-called secondary space, this space 6 6 is filled with thermally insulating porous material.

the ship's hull 7 properly said, with her upper deck 8, a duct 9 having a large diameter (1 to 1.5 meter) crossing the ceiling of primary barrier 1, secondary 3, and inner hull 5 and also the upper deck 8—being fitted in a tight way to these various walls—with the upper flange 10 having the possibility to be closed by a lid 11 attached by bolts (12) for example, a pipe 13, entering the tank 2, a three ways valve 14, connected to the pipe 13, a source of liquefied gas 15, an external liquefied gas storage tank 16, a pipe 17 connecting the source 15 to the valve 14 a three ways valve 19 a source of carbondioxide under gaseous phase 20, pipes 21, 22 and 23 connecting the three-ways valve 19 respectively, to secondary space 6, to the source 20 and to the outside of the tank, a three ways-valve 24, a carbon dioxide source 25, a heat-exchanger 26, carbon dioxide heater, pipes 27, 28, 29 and 30 connecting respectively, the pipe 27, the tank 2 to the valve 24; the pipe 28, the heat-exchanger 26 to the valve 24; the pipe 29, the source 25 to the heat-exchanger 26; and, the pipe 30, the valve 24 to the outside of the tank, a vertical cylindrical holder 31, which is fitted on the lid 11 of the flange 10, can rotate around its axis (arrow R) and slide along its axis (arrow F) similar to a periscope of submarines, a camera 32 known per se, either movie camera or television camera and in this latter case a screen 35 allows to watch simultaneously the recorded pictures.

Through the failures 36, 37 of the secondary barrier 3 there is a flow of carbon dioxide (arrow G) to the primary space 4. This gas diffuses through the porous insulating material filling the space 4 until it reaches the face 1a of the primary barrier 1 oriented towards secondary barrier 3. Almost face to face with each failure 36, 37 an aggregate 36a, 37a of sublimed carbon dioxide ice grows on this face 1a. Furthermore, it has to be also noted, that on the face 1b of the primary barrier opposite to the face 1a, almost on the other side of the primary barrier 1 where are the aggregates 36a, 37a, two other aggregates of carbon dioxide ice 36b, 37b have grown up, at least in the phase of the process of localization of the failures 36, 37 which is shown.

Now we have to define the various ways of the selective three ways valves 14, 19, 24.

The three-ways of the selective valve 14 are corresponding to:

way number one, lines 13 and 17 are connected and line 18 is closed;

way number two, lines 13, 17 and 18 are closed; and, way number three, lines 13 and 18 are connected, line 17 is closed.

The three ways of the selective valve 19 are corresponding to:

way number one, lines 21 and 22 are connected, and line 23 is closed;

way number two, lines 21, 22 and 23 are closed; and, way number three, lines 21 and 23 are connected, and, line 22 is closed.

The three ways of selective valve 24 are corresponding to:

way number one lines 27 and 28 are connected, and, line 30 is closed;

way number two, lines 27, 28 and 30 are closed; and, way number three lines 27 and 30 are connected, and, line 28 is closed.

The way the localization of the failures 36, 37, will be now described.

The ship arriving to port with her cargo of liquefied gas in her tanks 2, the first step will be to unload the tanks using way number three of selective valve 14. The liquefied gas contained in the tank 2 can be pumped out (the pump is not shown) and sent to tank 16.

During the same period of time, some carbon dioxide coming from source 20 is fed into secondary space 6 using pipes 22 and 21 and selective valve 19 way number one. As a result of the very low temperature (about minus 160° Celsius) of the primary barrier 1, the carbon dioxide diffuses (G) and sublimes—in the vicinity of failures 36, 37 of the secondary barrier 3, and some aggregates 36a, 37a of dry ice are growing on the face 1a of primary barrier 1.

After the tank 2 has been emptied of liquefied gas which was inside this tank must be gas-freed—for safety reasons—i.e. the remaining hydrocarbons under gaseous state must be removed and the tank must be also warmed-up. To get that, heated inert gas is fed into the tank. This inert gas, coming from source 25, passes through the heater 26 then through the lines 28 and 27 and the valve 24—way number one, and is injected warm into the tank 2.

This gas heavier than methane gas, is pushing the latter out of tank 2. Furthermore, touching the primary barrier 1, this gas becomes partially frost and forms a frost pellicle upon the face 1b, this pellicle will disappear when the warming-up operation is going on, except where are the aggregates of dry ice 30b, 37b, which are remaining colder than the rest of primary barrier 1, as a result of the presence of the dry-ice aggregates 36a 37a within the insulating material.

It is during this very period of time that the camera 32 has to be used to visually inspect and record the appearance of the face 1b in order to localize where are the islets of aggregates 36b, 37b; the frost having disappeared, the metallic face 1b is shining except at the places of islets of aggregates 36b, 37b. Since it is known the failures 36 and 37 are in the neighbourhood of the places of these aggregates, it is possible to avoid to damage the whole primary barrier 1 in order to find where are the few failures 36, 37 of the secondary barrier 3.

It is also worth noting that as an alternate—more general in fact than the above-described realization—without a particular choice of an inert gas able to sublime and to form aggregates 36b, 37b to be used for the warming up of the primary barrier 1, it is possible to localize directly the places of aggregates 36a, 37a, without seeing them, replacing the camera 32 by a thermograph or similar, able to detect and localize the coldest spots of the primary barrier 1 during warming-up operations.

It has also to be noted that during sea transportation of liquefied gas, the camera is not set inside tank 2, the perforated lid 11 being replaced by a complete lid.

Finally, the adjustment of the warming-up of the tank 2 is made possible adjusting the flow (26a) of carbon dioxide crossing the heat-exchanger 26.

The invention is in no way limited to the description given hereinabove and on the contrary, covers all modifications that can be brought thereto without departing from the scope and the spirit thereof.

What I claim is:

1. In a tank construction adapted to contain cryogenic liquefied gas such as liquefied natural gas including a first interior wall providing a primary barrier and defining a tank chamber for containing liquefied gas under pressure, a second intermediate wall providing a secondary barrier and spaced outwardly of said first wall and providing a primary space between the first and second walls, a third exterior wall outwardly of the second wall and providing a secondary space between the second and third walls, thermal insulating material filling said primary space, thermally insulating material filling the secondary space, a line communicating the tank chamber with an inert gas supply adapted, after the liquefied gas has been unloaded from the tank chamber, to push any remaining liquefied gas out of the tank chamber, and a line communicating the secondary space with a supply of safety gas, the safety gas having, under the pressure prevailing in the primary space, a sublimation temperature lower than the temperature prevailing in service within said secondary space and higher than the primary barrier temperature at said chamber prior to warming-up of the primary barrier, the provision of:

a temperature sensing means in said tank chamber for sensing temperatures at selected areas of said first wall after unloading of said liquefied gas;

and means for introducing and supporting said temperature sensing means in said tank chamber.

2. A tank construction as stated in claim 1 wherein said temperature sensing means is a thermograph.

3. A tank construction as stated in claim 1 wherein said temperature sensing means is an optical means for observing frost aggregates accumulated on the interior surface of said first wall during warmup of the tank chamber.

4. A tank construction as stated in claim 1 wherein said means for introducing and supporting said temperature sensing means in said chamber includes an aperture means extending through said first, second and third walls to said tank chamber;

and a moveable support column extending thru said aperture means, said temperature sensing means being carried on said column.

5. A tank construction as stated in claim 4 including means for moving said support column and said temperature sensing means for scanning the interior surface of said first wall.

6. In a method of locating failures in an intermediate wall of a multiple-wall tank construction in which a first interior wall provides a tank chamber, an intermediate second wall defines with the the first wall a continuous space around said first wall, and a third wall which defines a continuous space around the second wall, and lines adapted to carry fluid are in communication with said second space and said tank chamber, including the steps of:

unloading the contents in the tank chamber through one of said lines;

introducing safety fluid into said secondary space;

said safety fluid being adapted to penetrate and pass through any failures in said second intermediate wall to cause the growth of frost on the face of the first wall defining said primary space; and measuring the temperature difference between the areas on the first wall covered by frost and those without frost to identify the location of the failures in the second wall.

7. In a method as stated in claim 6 including the steps of:

progressively introducing warm inert gas into said tank chamber to cause a layer of frost on the internal surface of the first wall which defines said tank chamber; continuing warming of the tank chamber until said frost layer has almost disappeared; and visually inspecting any frost islet remaining, which correspond to the failure areas in the second wall, which occur directly opposite said remaining frost islets.

* * * * *